June 4, 1940.　　　　D. M. KENNEDY　　　　2,202,988
PICTURE PROJECTION SCREEN
Filed Jan. 23, 1939
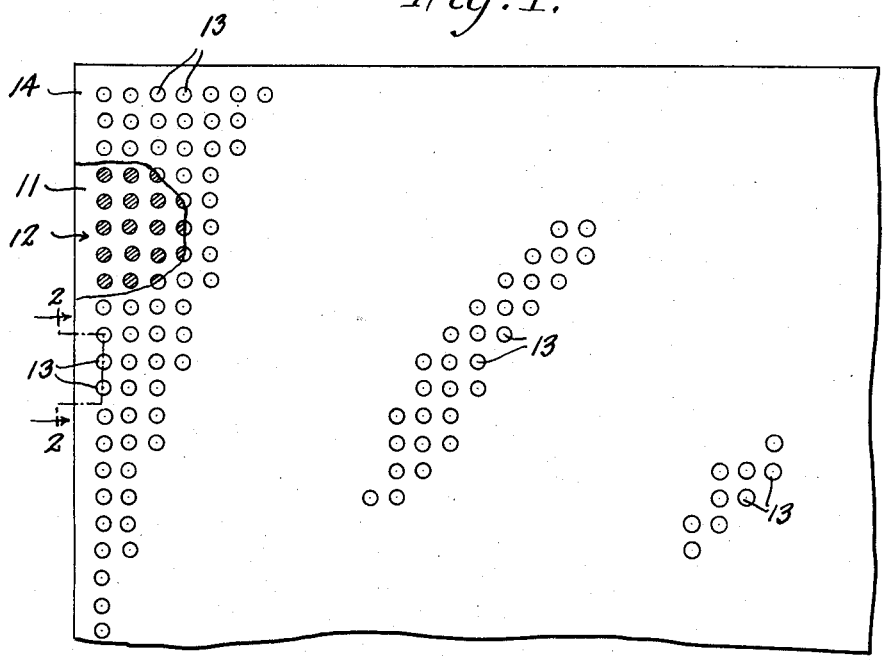
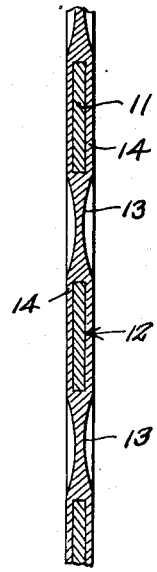
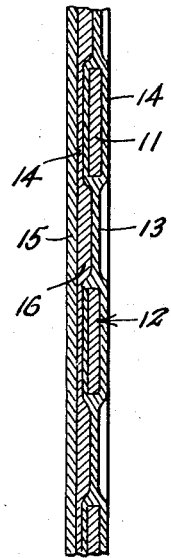
INVENTOR.
Dewey M. Kennedy
BY
Clarker Ott
ATTORNEYS Patented June 4, 1940

2,202,988

UNITED STATES PATENT OFFICE 2,202,988

PICTURE PROJECTION SCREEN

Dewey M. Kennedy, Rochester, N. Y.

Application January 23, 1939, Serial No. 252,320

2 Claims. (Cl. 88—24)

This invention relates to screens for receiving cinematographic, stereoscopic and other light projected pictures and has particular reference to an improved screen of the said character which is so constructed and arranged as to display the picture in relief thereby giving the impression of depth and simulating true three dimensional proportions.

The invention has in view a screen having a reflecting surface provided with offset, closely spaced, relatively small light diffusing areas which angularly reflect and disperse the light from points offset with reference to the body of the screen so that the reflected light from the offset areas displays the picture in relief giving the impression of depth.

The invention more particularly comprehends a screen including a flexible panel provided with closely spaced relatively small perforations substantially uniformly distributed thereover, with a flexible fabric backing bonded to the back of the panel by a pliable adhesive layer and with a metallic coating covering the opposite surfaces of the screen and the adhesive layer at the bottom of the perforations in which perforations the opaque coating is recessed from the front surface of the flexible panel to provide offset light diffusing areas.

With these and other objects in view, reference is now made to the following specification and accompanying drawing in which there is illustrated the preferred embodiments of the invention, while the appended claims cover variations and modifications thereof which fall within the scope of the invention.

In the drawing:

Fig. 1 is an enlarged fragmentary face view of a screen constructed in accordance with the invention.

Fig. 2 is a sectional view taken approximately on the line 2—2 of Fig. 1.

Fig. 3 is a similar sectional view showing a modified form of the invention.

Referring to the drawing by characters of reference, the screen includes a flexible transparent panel 11 having a plane forward surface 12 interspersed with closely spaced relatively small offset areas 13 which areas angularly reflect and diffuse, at points offset with reference to the plane surface 12, the light rays projected thereupon.

The light rays reflected from the offset areas 13 are dispersed angularly with reference to the light projected thereupon, while a projected picture is partially reflected from the plane surface 12 and partly from the offset areas 13 so as to display the picture in relief with the impression of depth.

In the embodiment illustrated, the offset areas 13 are formed by providing the flexible panel 11 with closely spaced relatively small perforations 5 and applying a coating 14 to opposite surfaces thereof so as to close the perforations with films of said coating, the forward faces of which are recessed from the surface of the panel.

The flexible panel 11 may be provided with a backing such as a flexible fabric backing 15 of cotton, linen or other suitable flexible material which is bonded to the panel 11 by a flexible adhesive 16 and with the coating 14 covering both faces of the panel 11 and the adhesive 16 at the bottom of the perforations. The adhesive 16 extends into the perforations in the panel 11 and provides a bond uniting the coating 14 in the perforations with the backing 15.

The flexible panel 11 preferably consists of a thin sheet of Celluloid which retains its original flexibility over a long period of time so that the panel and its backing may be rolled to a compact form when not in use. The flexible adhesive 16 preferably includes a cellulose acetate body or other cellulose ester, a solvent therefor and a softening agent, such as castor oil, which prevents undue hardening of the adhesive, while the coating 14 preferably consists of a metallic paint such as powdered aluminum or bronze in suspension in banana oil or amyl acetate.

In practice, it has been found that excellent results are obtained with the offset areas 13 being of circular formation, approximately $\frac{1}{32}$ of an inch in diameter and spaced apart approximately $\frac{1}{32}$ of an inch. These dimensions, however, may be varied as offset areas of $\frac{1}{16}$ of an inch in diameter will produce the desired results.

The solvent in the coating 14 acts upon the surface of the Celluloid panel 11 to render the same tacky so that the metallic paint becomes embedded in and intimately bonded to the surface thereof. The amyl acetate in the adhesive 16 likewise renders the adhesive miscible with the coating 14 and the rear surface of the Celluloid to provide a homogeneous structure.

The backing 15, together with the adhesive 16 and the coating 14 on the rear surface of the panel 11, forms an opaque reflecting medium at the rear of the panel, the coating 14 on the front surface of the panel being of such a nature as to partially reflect the light rays projected thereupon while such rays as pass therethrough will be reflected by the medium at the rear of the panel.

What is claimed is:

1. In a screen of the character described, a Celluloid panel having relatively small closely spaced perforations extending therethrough, a light reflecting metallic coating overlying the forward and rear surfaces of said panel and closing the perforations therein to provide offset areas recessed from the forward and rear surfaces of the panel, said coating including a powdered metal in suspension in amyl acetate, said coating on the forward surface of said panel partially reflecting and partially transmitting the light rays which fall thereon, a flexible fabric backing, and a flexible adhesive including a cellulose ester covering the forward face of the backing and the metallic coating on the rear of the panel and extending into the recesses in the rear of the panel defined by the coating in the said perforations and providing a bond uniting the coating on the back of the panel and in the perforations with the backing.

2. In a screen of the character described, a Celluloid panel having relatively small closely spaced perforations extending therethrough, a light reflecting metallic coating overlying the forward and rear surfaces of said panel and closing the perforations therein with films of said coating which define offset areas recessed from the forward surface of the panel, said coating on the forward surface of said panel partially reflecting and partially transmitting the light rays which fall thereon, a flexible fabric backing and a flexible adhesive covering the forward face of the backing and the metallic coating on the rear of the panel and providing a bond uniting the coating on the rear of the panel and the films in the perforations with the backing.

DEWEY M. KENNEDY.